(12) United States Patent
Falkowski et al.

(10) Patent No.: US 8,186,331 B2
(45) Date of Patent: May 29, 2012

(54) SPARK SUPPRESSION FOR A GENSET

(75) Inventors: David T. Falkowski, Blaine, MN (US);
Jeffrey D Peterson, St. Paul, MN (US);
Emily A. Blakemore, Minneapolis, MN (US); Kristopher G. Knight, St. Louis Park, MN (US); Matthew J. Ethen, New Brighton, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 428 days.

(21) Appl. No.: 12/586,738

(22) Filed: Sep. 25, 2009

(65) Prior Publication Data

US 2011/0074156 A1    Mar. 31, 2011

(51) Int. Cl.
*F02P 5/00* (2006.01)
*F02B 1/12* (2006.01)

(52) U.S. Cl. .................. 123/406.58; 123/143 A; 290/51

(58) Field of Classification Search ............... 123/143 A, 123/143 B, 143 R, 145 A, 145 R, 169 R, 123/146.5 R, 406.18, 406.49, 406.58, 406.68, 123/400, 401, 631, 632; 290/51
See application file for complete search history.

(56) References Cited

U.S. PATENT DOCUMENTS

| | | | |
|---|---|---|---|
| 4,198,941 A * | 4/1980 | Oishi | 123/406.54 |
| 4,658,787 A * | 4/1987 | Takizawa | 123/406.19 |
| 4,951,628 A * | 8/1990 | Matsuoka et al. | 123/406.65 |
| 5,425,348 A | 6/1995 | Bracken | |
| 5,443,055 A | 8/1995 | Schneider et al. | |
| 5,493,496 A | 2/1996 | James et al. | |
| 5,821,754 A | 10/1998 | Puettmann et al. | |
| 5,962,939 A | 10/1999 | Nakamura et al. | |
| 5,977,667 A | 11/1999 | Hirose | |
| 6,028,369 A | 2/2000 | Hirose et al. | |
| 6,362,533 B1 | 3/2002 | Morohoshi et al. | |
| 6,388,445 B1 | 5/2002 | Andersson | |
| 6,425,383 B1 | 7/2002 | Raeske et al. | |
| 6,489,690 B1 | 12/2002 | Hatsugai et al. | |
| 6,782,880 B2 | 8/2004 | Schmied | |
| 6,880,525 B2 * | 4/2005 | Geyer et al. | 123/406.18 |
| 7,027,907 B2 * | 4/2006 | Le Gall et al. | 701/105 |
| 7,225,793 B2 | 6/2007 | Schwulst et al. | |
| 7,974,767 B2 * | 7/2011 | Maier et al. | 701/110 |
| 2001/0010218 A1 * | 8/2001 | Yamazaki et al. | 123/486 |
| 2001/0025625 A1 * | 10/2001 | Schneider | 123/406.58 |
| 2002/0112536 A1 * | 8/2002 | Shimoyama et al. | 73/117.3 |
| 2006/0218998 A1 * | 10/2006 | Machida et al. | 73/117.3 |
| 2009/0126685 A1 * | 5/2009 | Asada et al. | 123/406.19 |

* cited by examiner

*Primary Examiner* — John T. Kwon
*Assistant Examiner* — Johnny Hoang
(74) *Attorney, Agent, or Firm* — Krieg DeVault LLP (57) ABSTRACT

A method for operating a four-stroke internal combustion engine including a crankshaft coupled to a piston, which includes moving the piston in accordance with a sequence of four different strokes; mechanically driving an electric power generator with the crankshaft during the operating of the engine; generating a first sensor signal indicative of each revolution of the crankshaft with the crankshaft rotating twice during the sequence of four different strokes; providing a second sensor signal corresponding to a working fluid characteristic of the engine, the working fluid characteristic changing during the sequence of four different strokes of the piston; and timing ignition of the engine as a function of the first sensor signal and the second sensor signal.

19 Claims, 7 Drawing Sheets

SPARK SUPPRESSION FOR A GENSET

BACKGROUND

The present application relates to internal combustion engine control techniques, and more particularly, but not exclusively, relates to selective spark suppression for an internal combustion engine of a genset.

Recreational vehicles are an increasingly popular consumer item due at least in part to the many modern conveniences that may be installed in them. Increasingly, such vehicles carry an electric power genset to electrically power such devices, including, for example, heaters, lighting, entertainment equipment, electronic devices, kitchen appliances and so forth. While low noise genset operation is often highly desired, this desire tends to compete with the goal of providing a simple, low-cost, genset that occupies little space. Accordingly, there is a demand for further contributions in this area of technology.

SUMMARY

One embodiment of the present application includes a unique technique to control an internal combustion engine. Other embodiments include unique apparatus, devices, systems, and methods of selectively suppressing an ignition spark for an internal combustion engine of a genset. Further embodiments, forms, objects, features, advantages, aspects, and benefits of the present application shall become apparent from the detailed description and figures included herewith.

BRIEF DESCRIPTION OF THE DRAWINGS

The figures are not necessarily to scale, emphasis instead being placed upon illustrating the principles of the invention. Moreover, in the figures, like reference numerals designate corresponding parts throughout the different views.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is intended, and any alteration or further modification of the illustrated device, and any further application of any principle of the invention as illustrated or described herein is contemplated as would normally occur to one skilled in the art to which the invention relates.

Figure 1:
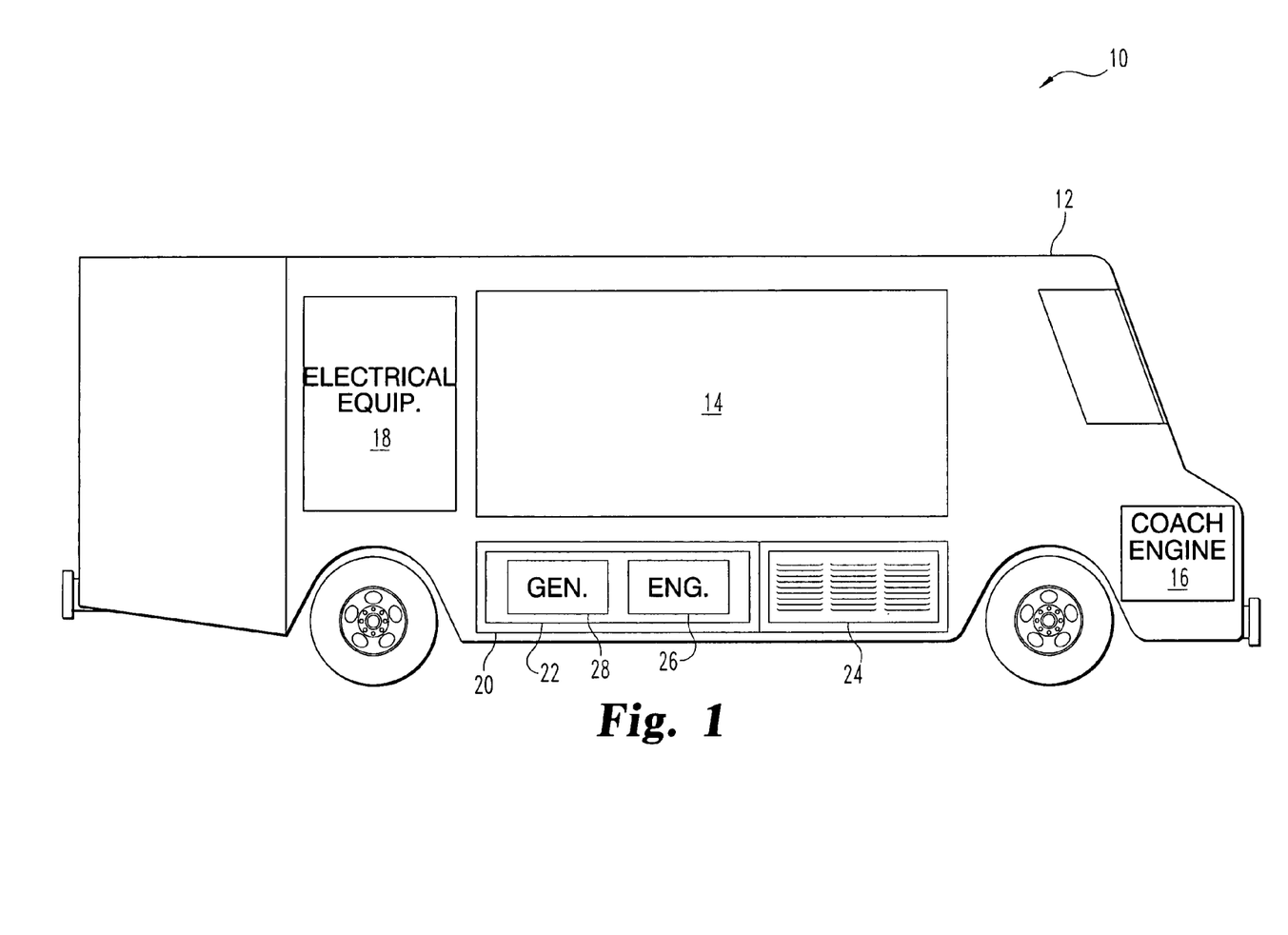
FIG. 1 is a diagrammatic view of a vehicle carrying an electric power generation system.

FIG. 1 illustrates a vehicle 10 in the form of a motor coach 12. Motor coach 12 includes an interior living space 14 and is propelled by a coach engine 16. Coach engine 16 is typically of a reciprocating piston, internal combustion type. To complement living space 14, motor coach 12 carries various types of electrical equipment 18, such as lighting, kitchen appliances, entertainment devices, and/or such different devices as would occur to those skilled in the art.

Motor coach 12 carries an electric power generation system 20 to selectively provide electricity to electrical equipment 18. Correspondingly, electrical equipment 18 electrically loads electric power generation system 20. In one form, electric power generation system 20 is located in a storage bay or other dedicated space 24 of motor coach 12. Storage bay 24 may include a vented door that provides access to electric power generation system 20. In another form, electric power generation system 20 is positioned under the floor between support rails of a chassis for motor coach 12.

As set forth in greater detail below, electric power generation system 20 includes at least an internal combustion engine and a generator that constitute a genset 22, as that term is commonly understood by those skilled in the art, operable to provide electricity to power electrical equipment 18.

Although illustrated as a motor coach 12, it should be appreciated by those skilled in the art that electric power generation system 20 disclosed herein can be utilized in other types of vehicles such as pull along campers, marine craft, truck trailers, travel trailers, SUTs, $5^{th}$ wheels, Class A and C RVs, work vehicles, and larger recreational vehicles. In addition, electric power generation system 20 can be utilized in commercial settings, residential settings, and as a portable unit, in other applications.

Figure 2:
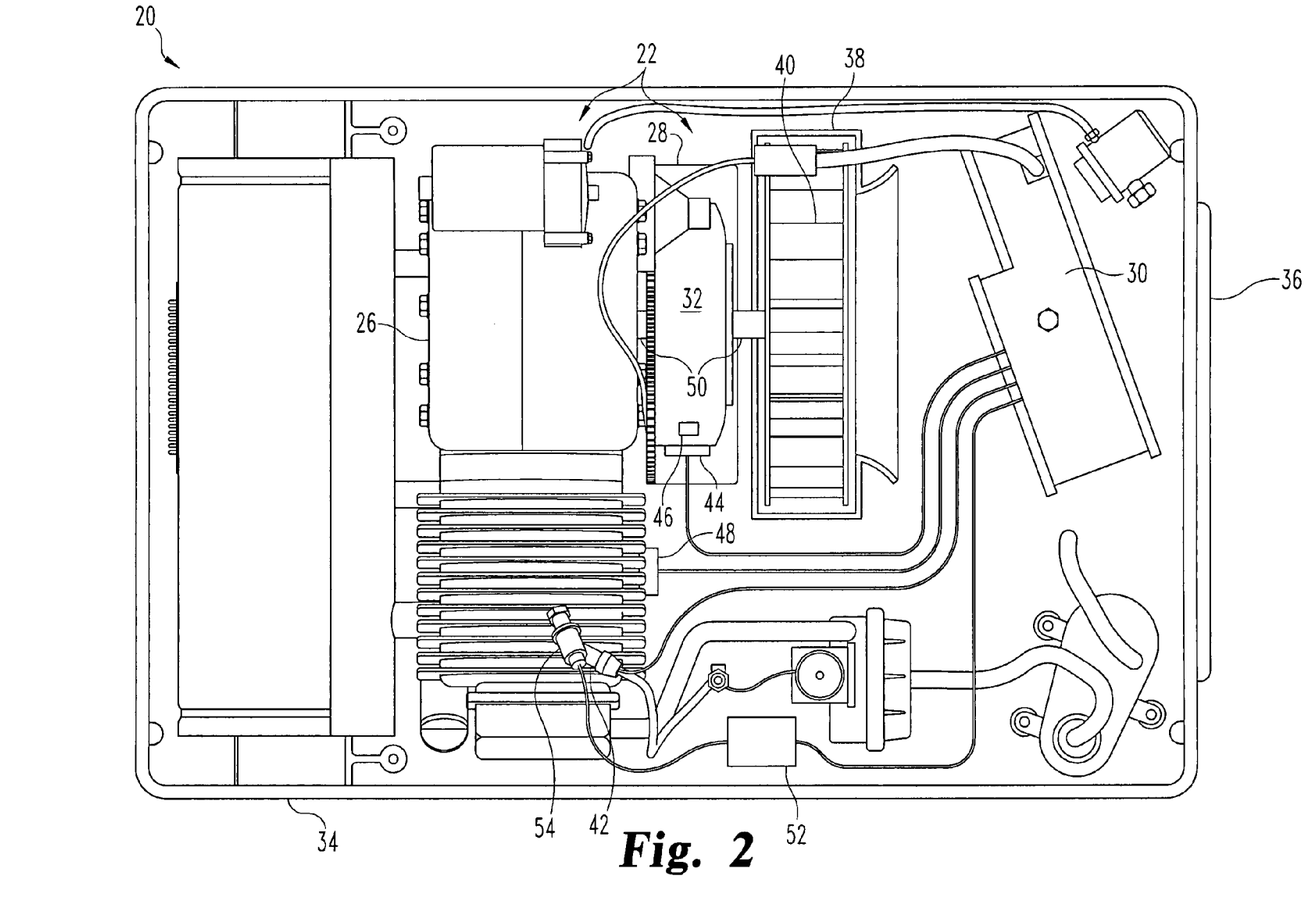
FIG. 2 is a partial schematic of a genset with an engine, crankshaft and rotor.

As shown in FIG. 2, genset 22 includes an internal combustion engine 26 coupled to a generator 28. Engine 26 is a gasoline-fueled type with Electronic Fuel Injection (EFI). In other embodiments, engine 26 may be fueled by a different type of liquid fuel, such as ethanol, or may be a gaseous-fueled type that uses propane as a fuel, for example; and/or a different type of fueling technique other than EFI may be used.

Electric power generation system 20 also includes a controller 30. Controller 30 can be an electronic circuit comprised of one or more components, including digital circuitry, analog circuitry, or both. Controller 30 may be a software and/or firmware programmable type; a hardwired, dedicated state machine; or a combination of these. In one embodiment, controller 30 is a programmable microcontroller solid-state integrated circuit that integrally includes a central processing unit and memory. The memory of controller 30 can be comprised of one or more components and can be of any volatile or nonvolatile type, including the solid state variety, the optical media variety, the magnetic variety, a combination of these, or such different arrangement as would occur to those skilled in the art. Further, more than one processing unit can be included. When multiple processing units are present, controller 30 can be arranged to distribute processing among such units, and/or to provide for parallel or pipelined processing if desired. Controller 30 functions in accordance with operating logic defined by programming, hardware, or a combination of these. In one form, the memory of controller 30 stores programming instructions executed by the processing unit of controller 30 to embody at least a portion of this operating logic. Alternatively or additionally, the memory of controller 30 stores data that is manipulated by the operating logic of controller 30. Controller 30 can include signal conditioners, signal format converters (such as analog-to-digital and digital-to-analog converters), limiters, clamps, filters, and the like as needed to perform various control and regulation operations described in the present application.

In one form, generator 28 is operable to generate an alternating current ("AC") output voltage signal and, if necessary, a direct current ("DC") output voltage signal. When engine 26 is started, it provides mechanical, rotational energy to drive generator 28 —producing AC electrical power. In one form, generator 28 is of a variable speed, alternator type that is rectified to provide a rectified DC power bus that can be provided to various DC loads of electrical equipment 18 and/or to maintain a charged status of one or more batteries. For this form, the DC electric power is inverted to provide a fixed frequency AC output (such as 120 VAC at a frequency of 60 Hertz) despite speed variation of genset 22 (engine 26 and generator 28). However, in other embodiments, a different type of generator and/or power circuitry arrangement could be employed.

Referring to FIG. 2, a partial schematic view of engine 26, generator 28 and controller 30 representative of an electric power generation system 20 is set forth. Electric power generation system 20 includes a two-piece enclosure 34. Enclosure 34 houses a genset 22 as well as various other components of electric power generation system 20. Enclosure 34 is illustrated as being generally rectangular in shape.

Enclosure 34 includes an air inlet 36 that allows ambient air to enter enclosure 34. Electric power generation system 20 also includes a cooling system 38 connected with engine 26. Cooling system 38 includes a cooling fan assembly 40 and cover assembly (not shown). Cooling fan assembly 40 is powered by engine 26 to help cool engine 26. In the illustrated example, engine 26 is a liquid cooled internal combustion engine.

Controller 30 controls fuel injection and spark ignition timing based on operating conditions such as crankshaft position and working fluid characteristics of engine 26. The amount of fuel metered to engine 26 is controlled by cycling at least one injector 42 on and off. Fuel pressure in at least one injector 42 is maintained by cycling a high pressure pump (not shown) on and off based on these operating conditions. Spark ignition timing is controlled by a signal to an ignition kill switch 52 which allows a signal to be received by a spark plug 54 based on engine 26 operating conditions. Crankshaft position is determined by a signal from a crankshaft position sensor 44 to controller 30 triggered by an indicator 46 on a rotor 32. A crankshaft 50 from engine 26 turns rotor 32. Manifold absolute pressure (MAP) is a working fluid characteristic of engine 26. A MAP sensor 48 communicates a signal to controller 30 as the MAP changes during the sequences of engine 26.

Figure 3:
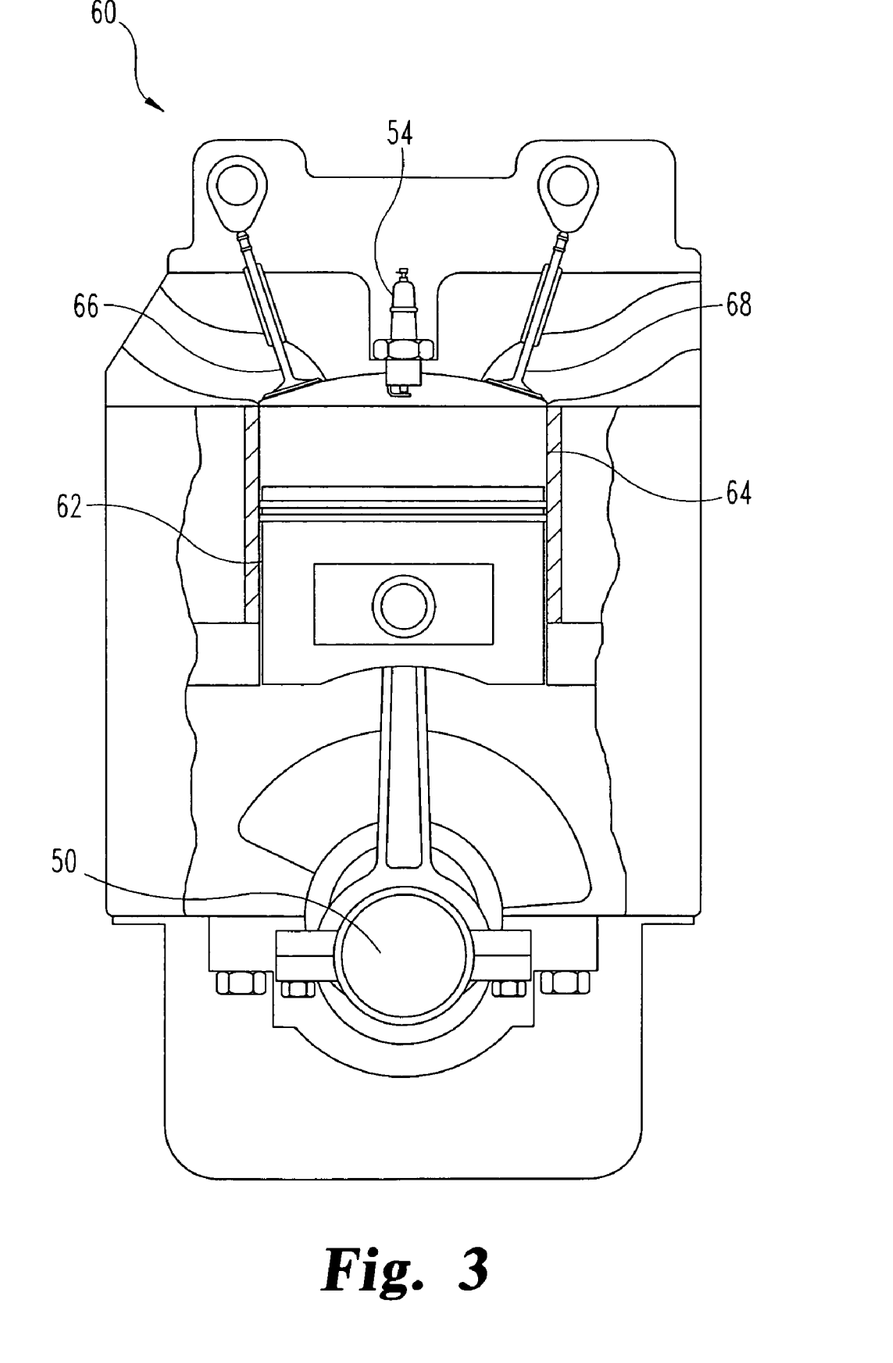
FIG. 3 is a diagrammatic view of an engine cylinder as part of the genset of FIG. 2.

A schematic view of engine 26 is shown in FIG. 3. Engine 26 is a four stroke engine 60 which includes a crankshaft 50 and a piston 62. Crankshaft 50 and piston 62 translate the reciprocating linear motion of piston 62 into the rotational motion of crankshaft 50. Piston 62 is located in a cylinder 64 and the force from expanding gas resulting from combustion in cylinder 64 causes the linear motion of piston 62 that is then transferred to the rotation of crankshaft 50. Engine 26 can operate with a single cylinder or multiple cylinders. Crankshaft 50 is connected to rotor 32 of generator 28 thereby converting the mechanical rotational motion from engine 26 through crankshaft 50 to rotor 32 of generator 28 into electrical energy to be consumed by electrical equipment 18.

Figure 4:
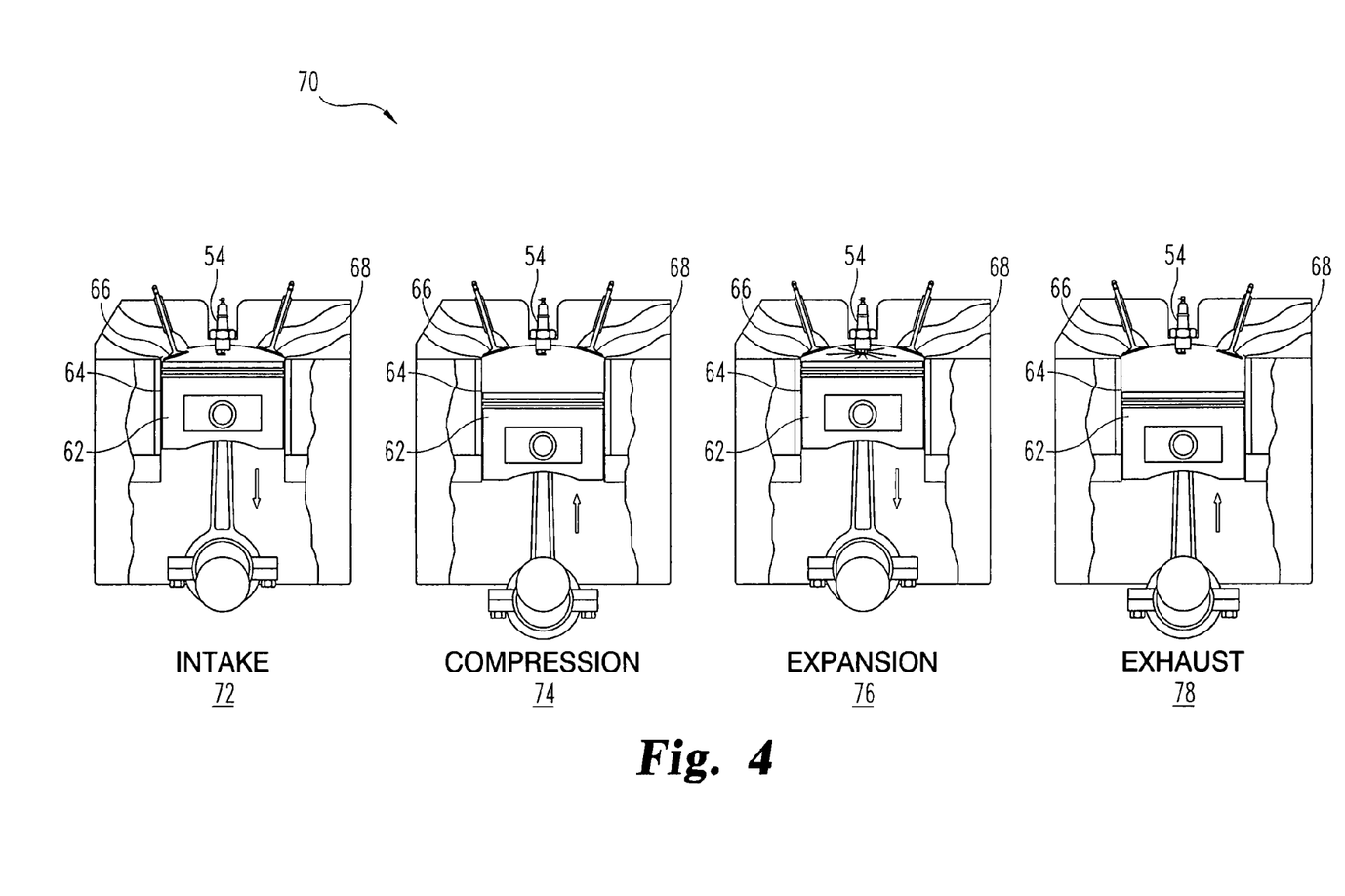
FIG. 4 is a diagrammatic view of a four stroke engine cycle for the engine in FIG. 3.

Engine 26 operates with a four stroke cycle 70 of piston 62 moving up and down as shown in FIG. 4. Piston 62 moves up and down completing two strokes with every rotation of crankshaft 50, therefore two rotations of crankshaft 50 are needed to complete four piston strokes. An intake stroke 72 is the addition of an air/fuel mix into cylinder 64 through an open intake valve 66 as piston 62 lowers. An exhaust valve 68 is closed during intake stroke 72 and there is no spark from spark plug 54. A compression stroke 74 is the compression of the air/fuel mix as piston 62 rises. Both intake valve 66 and exhaust valve 68 are closed during compression stroke 74. The spark from spark plug 54 is triggered at the end of compression stroke 74. For the most efficient use of engine 26, spark plug 54 must be ignited at an optimal crank angle position as piston 62 comes to the end of compression stroke 74. The spark from spark plug 54 ignites the air/fuel mix and the expanding air creates the force that moves piston 62 down in an expansion stroke 76. An exhaust stroke 78 releases the exhaust gases from cylinder 64 through open exhaust valve 68 as piston 62 rises and places piston 62 in the top position to start four stroke cycle 70 over with drawing the air/fuel mixture in through open intake valve 66 with intake stroke 72.

Figure 5:
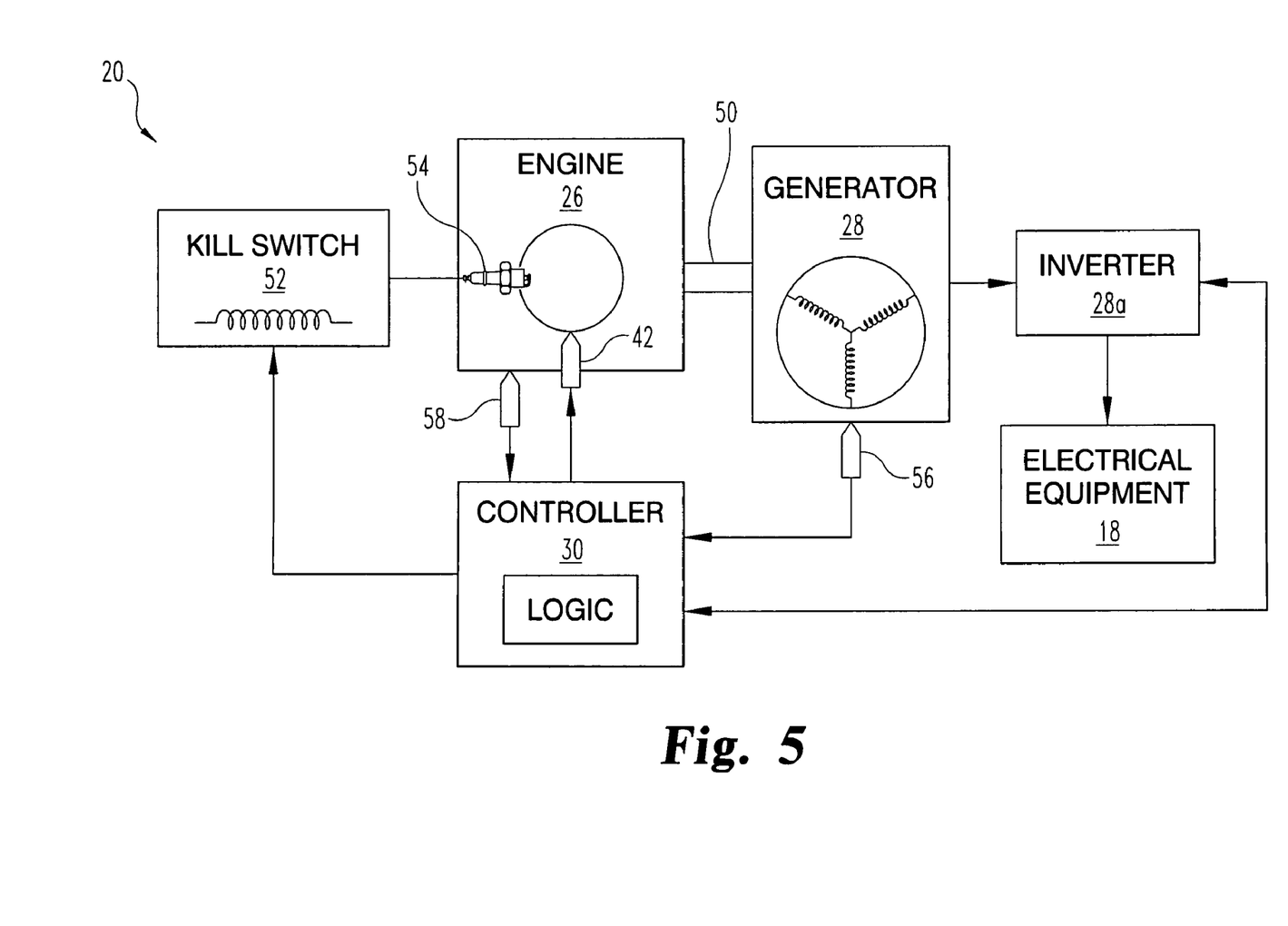
FIG. 5 is a diagrammatic view of various components of the electric power generation system of FIG. 1.

FIG. 5 shows a schematic of electric power generation system 20 where controller 30 controls engine 26 transferring rotational energy to generator 28. Generator 28 converts rotational energy to electrical energy which is then rectified in an inverter 28a before being utilized by electrical equipment 18. To ensure that the spark is ignited at the optimal crank angle position, a first sensor 56 and a second sensor 58 provide information to controller 30 to determine where in four stroke cycle 70 engine 26 is operating. In one embodiment, first sensor 56 is crankshaft position sensor 44 which generates a crankshaft position signal providing a signal for each rotation of crankshaft 50. Because crankshaft 50 rotates twice for each complete engine cycle in a four stroke engine, crankshaft 50 reaches the optimal crank angle twice during the engine cycle —once at the end of compression stroke 74 and again at the end of exhaust stroke 78. To determine which crankshaft position signal corresponds with the optimal crankshaft angle at the end of compression stroke 74, second sensor 58 is utilized to sense working fluid characteristics of cylinder 64. The working fluid characteristics change as piston 62 moves up and down progressing through four stroke cycle 70. In one form the working fluid characteristic is manifold pressure. Second sensor 58 can be MAP sensor 48 monitoring manifold absolute pressure (MAP) which can be used by controller 30 to determine which stroke piston 62 is operating in.

In one embodiment, when controller 30 determines engine 26 is approaching the end of compression stroke 74 as a function of a first signal from crankshaft position sensor 44 and a second signal from MAP sensor 48, a spark is triggered as the crank angle approaches the optimal angle. When controller 30 determines engine 26 is not approaching the end of compression stroke 74 but the end of exhaust stroke 78, controller triggers kill switch 52 to prevent an unneeded spark from firing. Some existing systems allow a second spark at the end of exhaust stroke 78 to maintain the simplicity of a distributorless ignition system. In a multi-cylinder system where a single ignition coil operates two spark plugs, the ignition coil triggers a spark in both cylinders though the cylinders are 360° out of phase. While one cylinder is reaching the end of compression stroke 74, the other cylinder is reaching the end of exhaust stroke 78. The spark to the cylinder at the end of the exhaust stroke is unessential.

Figure 6:
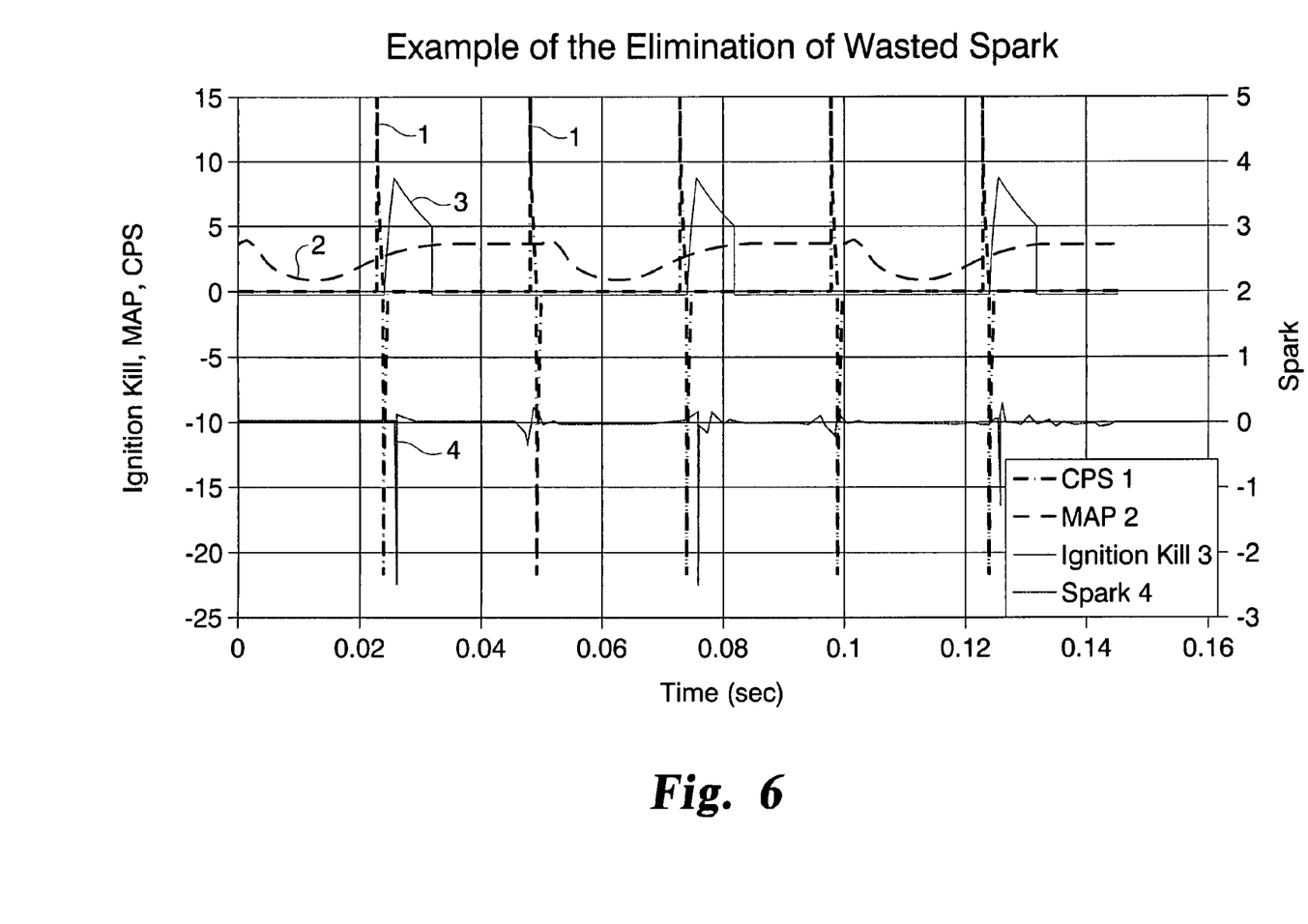
FIG. 6 is a graph illustrating operation of an electric power generation system.

FIG. 6 shows a graph demonstrating one embodiment of the present invention where the operating of a first signal from a first sensor 56 and a second signal from a second sensor 58 produce an alternating spark as crankshaft 50 moves through four stroke cycle 70. The crankshaft position is represented by CPS 1. A spike occurs every 360° as crankshaft position sensor 44 senses indicator 46 on rotor 32 as crankshaft 50 reaches the optimal crankshaft angle. The MAP is represented by MAP 2. MAP decreases as engine 26 moves through intake stroke 72 triggering a signal to controller 30.

Controller then triggers ignition kill switch 52 which is represented by Ignition Kill 3, allowing a spark as represented by Spark 4. During the next cycle when CPS 1 signals that crankshaft 50 has reached the optimal crankshaft angle, there is no change in MAP 2. Therefore, controller 30 does not trigger ignition kill switch 52 as seen in an absence of charge in Ignition kill 3 and no spark is shown with Spark 4. This process is repeated as engine 26 progresses through four stroke cycle 70.

Figure 7:
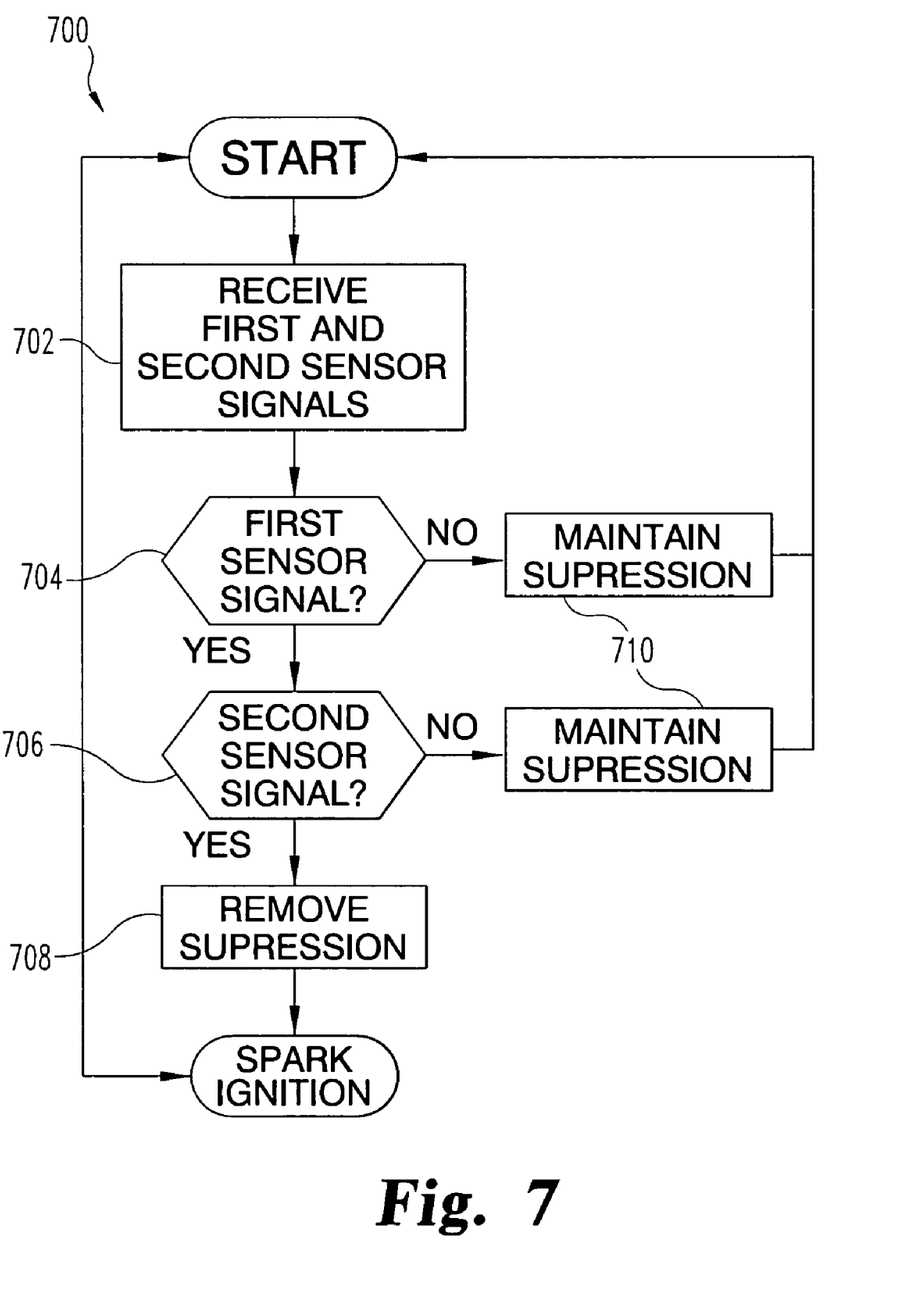
FIG. 7 is a schematic flow diagram of a procedure for selective spark suppression.

FIG. 7 is a schematic flow diagram of procedure 700 for selectively suppressing a spark. Procedure 700 includes an operation 702 to receive signals from first sensor 56 and second sensor 58. In procedure 700 operation 702 is followed by an operation 704 to determine crankshaft position angle based on the signal from first sensor 56.

In response to a positive signal from first sensor 56, procedure 700 includes operation 706 to determine a change in a working fluid characteristic of engine 26 from second sensor 58.

In response to a positive signal from second sensor 58, procedure 700 includes operation 708 triggering a signal to ignition kill switch 52 allowing spark plug 54 to spark ignition. When either operation 702 or 704 has a negative response, operation 710 maintains spark suppression and returns to the beginning of procedure 700 to be repeated.

In one embodiment, the method includes (1) operating a four-stroke internal combustion engine 26 including a crankshaft 50 coupled to a piston 62, which includes moving the piston 62 in accordance with a sequence of four different strokes 70; (2) mechanically driving an electric power generator 28 with the crankshaft 50 during the operating of the engine 26; (3) generating a first sensor signal 56 indicative of each revolution of the crankshaft 50, the crankshaft 50 rotating twice during the sequence of the four different strokes 70; (4) providing a second sensor signal 58 corresponding to a working fluid characteristic of the engine 26, the working fluid characteristic changing during the sequence of the four different strokes 70 of the piston 62; and (5) timing ignition of the engine 26 as a function of the first sensor signal 56 and the second sensor signal 58.

In another embodiment, the engine 26 speed is varied in accordance with electrical loading 18 of the generator 28 and an AC electrical output is provided with an inverter 28a coupled to the generator 28. In yet another embodiment the electrical loading 18 is part of a motor coach 12.

In another form, the engine 26 includes an intake manifold and the signal from second sensor 58 is indicative of intake manifold pressure of the engine 26. In yet another form, the signal from first sensor 56 is provided with a magnetically detectable marker 46 positioned on a rotor 32 that turns with the crankshaft 50.

In one embodiment, the engine 26 includes multiple pistons 62. In yet another embodiment, the method includes discriminating between at least one of the four different strokes 70 and at least one other of the four different strokes 70 in accordance with the working fluid characteristic of engine 26.

One form of the apparatus includes a genset 22 including a four-stroke internal combustion engine 26 and an electric power generator 28. The engine 26 includes at least one piston 62 within a cylinder 64 coupled to a crankshaft 50. The crankshaft 50 is coupled to the electric power generator 28 to provide mechanical power. Included is a first sensor 56 to provide a first signal indicative of a position of the crankshaft 50. The crankshaft 50 rotates twice during each sequence of four different strokes 70 of the piston 62. Also, included is second sensor 58 to provide a second signal corresponding to a working fluid characteristic of the engine 26. The working fluid characteristic varies with the sequence of the four different strokes 70 of the piston 62. A controller 30 is included that is responsive to the signal from the first sensor 56 and the signal from the second sensor 58 to generate an ignition signal to time ignition of the engine 26. An ignition device 54 is responsive to the ignition signal to ignite a combustible charge compressed by the piston 62.

In one embodiment, the engine 26 includes multiple pistons 62 within corresponding cylinders 64. The engine 26 also includes an intake manifold and the signal from the second sensor 58 is indicative of the intake manifold pressure of the engine 26. The signal from the first sensor 56 is provided with a magnetically detectable marker 46 positioned on a rotor 32 that turns with the crankshaft 50. The ignition device 54 includes a distributorless ignition system. Further included is a motor coach 12 where the genset 22 provides electric power to the motor coach 12.

In one form the method includes: (1) operating a genset 22 including an internal combustion engine 26 and an electric power generator 28 where the engine 26 includes a piston 62 coupled to a crankshaft 50 and the crankshaft 50 is coupled to the electric power generator 28 to provide mechanical power; (2) generating a signal from first sensor 56 indicative of each revolution of the crankshaft 50 with the crankshaft 50 rotating twice for each sequence of four different strokes 70 of the piston 62; (3) providing a signal from a second sensor 58 corresponding to pressure of a working fluid characteristic provided to the engine 26; and (4) timing ignition of the engine 26 as a function of the signal from the first sensor 56 and the signal from the second sensor 58.

In another form, the method includes: (1) operating a four-stroke internal combustion engine 26 with a crankshaft 50 coupled to a piston 62, which includes moving the piston 62 within a cylinder 64 in response to an ignition device 54 in accordance with a sequence of four different strokes 70 including an intake stroke 72, a compression stroke 74, a combustion stroke 76 and an exhaust stroke 78; (2) mechanically driving an electric power generator 28 coupled to the crankshaft 50 during the operating of the engine 26; (3) providing a signal from a first sensor 58 corresponding to a working fluid characteristic of the engine 26, the working fluid characteristic changing during the sequence of the four different strokes 70 of the piston 62; (4) determining a piston mode when the piston 62 is not operating in the exhaust stroke 78 as a function of the signal from a first sensor 58; and (5) timing the ignition of the ignition device 54 as a function of the piston mode determination to suppress a spark by the ignition device 54 during the intake stroke 46.

In yet another form, the ignition device 54 further includes a distributorless ignition system. In still another form, the engine 26 includes an intake manifold and the signal from a first sensor 58 is indicative of intake manifold pressure of the engine 26. Another form further includes generating a signal from a second sensor 56 indicative of each revolution of the crankshaft 50 with the crankshaft 50 rotating twice during the sequence of the four different strokes 70 and determining when the piston mode is not operating in an exhaust stroke 78 as a function of the signal from a first sensor 58 and the signal from a second sensor 56. In another form, the engine 26 includes multiple pistons 62.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
   operating a four-stroke internal combustion engine including a crankshaft coupled to a piston, which includes moving the piston in accordance with a sequence of four different strokes;
   mechanically driving an electric power generator with the crankshaft during the operating of the engine;
   generating a first sensor signal indicative of each revolution of the crankshaft, the crankshaft rotating twice during the sequence of four different strokes;
   providing a second sensor signal corresponding to a working fluid characteristic of the engine, the working fluid characteristic changing during the sequence of four different strokes of the piston; and
   timing ignition of the engine as a function of the first sensor signal and the second sensor signal.

2. The method of claim 1, which includes:
   varying engine speed in accordance with an electrical loading of the generator; and
   providing an AC electrical output with an inverter coupled to the generator.

3. The method of claim 2, which further includes the electrical loading as part of a motor coach.

4. The method of claim 1, wherein the engine includes an intake manifold and the second sensor signal is indicative of intake manifold pressure of the engine.

5. The method of claim 3, wherein the first sensor signal is provided with a magnetically detectable marker positioned on a rotor that turns with the crankshaft.

6. The method of claim 1, wherein the engine includes multiple pistons.

7. The method of claim 1, which includes discriminating between at least one of the four different strokes and at least one other of the four different strokes in accordance with the working fluid characteristic.

8. An apparatus, comprising:
   a genset including a four-stroke internal combustion engine and an electric power generator, the engine including at least one piston within a cylinder coupled to a crankshaft, the crankshaft being coupled to the electric power generator to provide mechanical power thereto;
   a first sensor to provide a first signal indicative of a position of the crankshaft, the crankshaft rotating twice during each sequence of four different strokes of the piston;
   a second sensor to provide a second signal corresponding to a working fluid characteristic of the engine, the working fluid characteristic varying with the sequence of four different strokes of the piston; and
   a controller responsive to the first signal and the second signal to generate an ignition signal to time ignition of the engine; and
   an ignition device responsive to the ignition signal to ignite a combustible charge compressed by the piston.

9. The apparatus of claim 8, wherein the engine includes multiple pistons within corresponding cylinders.

10. The apparatus of claim 8, wherein the engine includes an intake manifold and the second sensor signal is indicative of intake manifold pressure of the engine.

11. The apparatus of claim 8, which further includes a motor coach wherein the genset provides electric power to the motor coach.

12. The apparatus of claim 8, wherein the ignition device includes a distributorless ignition system.

13. The apparatus of claim 8, wherein the first sensor signal is provided with a magnetically detectable marker positioned on a rotor that turns with the crankshaft.

14. A method, comprising:
   operating a genset including an internal combustion engine and an electric power generator, the engine including a piston coupled to a crankshaft, the crankshaft being coupled to the electric power generator to provide mechanical power thereto;
   generating a first sensor signal indicative of each revolution of the crankshaft, the crankshaft rotating twice for each sequence of four strokes of the piston;
   providing a second sensor signal corresponding to pressure of a working fluid characteristic provided to the engine; and
   timing ignition of the engine as a function of the first sensor signal and the second sensor signal.

15. A method, comprising:
   operating a four-stroke internal combustion engine including a crankshaft coupled to a piston, which includes moving the piston within a cylinder in response to an ignition device in accordance with a sequence of four different strokes including an intake stroke, a compression stroke, a combustion stroke and an exhaust stroke;
   mechanically driving an electric power generator coupled to the crankshaft during the operating of the engine;
   providing a first sensor signal corresponding to a working fluid characteristic of the engine, the working fluid characteristic changing during the sequence of four different strokes of the piston;
   determining a piston mode when the piston is not operating in the exhaust stroke as a function of the first sensor signal; and
   timing ignition of the ignition device as a function of the piston mode determination to suppress a spark by the ignition device during the exhaust stroke.

16. The method of claim 15, wherein the ignition device further includes a distributorless ignition system.

17. The method of claim 15, wherein the engine includes an intake manifold and the first sensor signal is indicative of intake manifold pressure of the engine.

18. The method of claim 15, further including generating a second sensor signal indicative of each revolution of the crankshaft, the crankshaft rotating twice during the sequence of four different strokes and determining when the piston mode is not operating in the exhaust stroke as a function of the first sensor signal and the second signal.

19. The method of claim 15, wherein the engine includes multiple pistons.

* * * * *